T. A. GANNOE.
TROLLEY WHEEL.
APPLICATION FILED FEB. 18, 1908.
928,119.
Patented July 13, 1909.
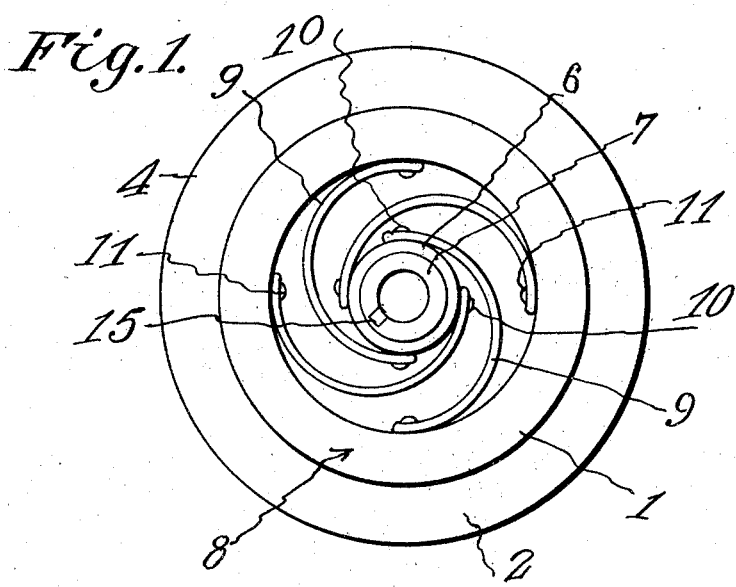
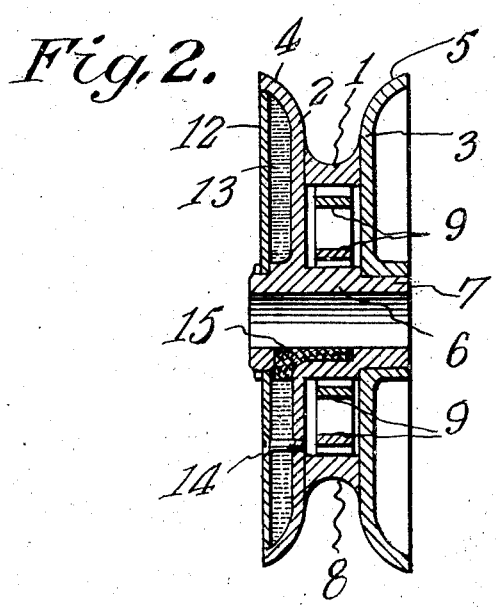
Witnesses
Joe. P. Waller
P. M. Smith
Inventor
Thomas A. Gannoe.
By Victor J. Evans.
Attorney

UNITED STATES PATENT OFFICE.

THOMAS A. GANNOE, OF WARREN, PENNSYLVANIA, ASSIGNOR OF THREE-EIGHTHS TO JOHN SCHMUTZ, OF WARREN, PENNSYLVANIA.

TROLLEY-WHEEL.

No. 928,119.  Specification of Letters Patent.  Patented July 13, 1909.

Application filed February 18, 1908. Serial No. 416,492.

*To all whom it may concern:*

Be it known that I, THOMAS A. GANNOE, a citizen of the United States, residing at Warren, in the county of Warren and State of Pennsylvania, have invented new and useful Improvements in Trolley-Wheels, of which the following is a specification.

This invention relates to trolley wheels and has for its object to provide a wheel embodying a construction which will adapt the same to cling with greater reliability to the overhead wire or conductor, maintain practical continuous contact between the wheel and conductor and which at the same time will yield upon striking a kink or other projection on the wire without leaving the wire or breaking the electrical contact. In fact, when the kink or projection on the wire is struck by the wheel, the depth of the wire receiving groove in the wheel is increased which correspondingly reduces the tendency of the wheel to jump the wire.

With the above and other objects in view, the invention consists in the novel construction, combination and arrangement of parts as herein fully described, illustrated and claimed.

In the accompanying drawings:—Figure 1 is a side elevation of a trolley wheel embodying the present invention. Fig. 2 is a diametrical section through the same.

The trolley wheel contemplated in this invention comprises essentially three main parts, that is to say, an inner section 1 and a pair of outer sections 2 and 3, the inner section being movably mounted between the outer sections 2 and 3 which are spaced apart a suitable distance to receive and admit of the movement of the inner section. Each of the outer sections is shown as dished in its outer face to provide outwardly curving and diverging rims or flanges 4 and 5 which give a flaring form to the groove in which the overhead wire or conductor is received. One of the outer sections is provided with a hub 6 the end of which is reduced as shown at 7 to permit the other outer section to be fitted thereon and fastened by any approved method.

The inner section 1 is grooved in its outer peripheral face as shown at 8 to form the continuations and base of the groove for the overhead conductor. The section 1 is in the form of an annular rim and is connected to the hub 6 by means of a plurality of cushion springs 9 preferably of semi-circular form as shown in Fig. 1, the inner ends thereof being secured by fasteners 10 to the hub while the outer ends thereof are secured by fasteners 11 to the inner section 1 of the wheel. The arrangement of springs described holds the inner section substantially concentric with the outer sections except when excessive strain is brought to bear on the inner section, as for example, the inner section coming in contact with kinks or projections on the overhead conductor, whereupon said inner sections yield in a downward direction relatively to the outer sections, which results in diametrically deepening the groove at the top of the wheel and insuring the retention of the wheel in engagement with the wire. At the same time the concussion of the blow is relieved and the inner section is maintained in continuous electrical contact with the conductor. The construction described also has the effect of increasing the life of both the trolley wheel and overhead conductor by doing away with excessive strains.

One of the outer sections has its outer side closed in by a housing plate 12 thereby forming an inclosed oil chamber 13 to which oil may be introduced by the removal of a filling plug 14. Oil is conducted to the journal by means of a wick or an absorbent feeder 15, a portion of which lies within the oil chamber 13 while another portion thereof rests in contact with the journal. The lubricant is thus fed gradually and uniformly to the journal.

Having thus described the invention, what is claimed as new, is:—

A wheel of the class described comprising outer sections connected together to leave an intervening space with parallel walls, a movable section mounted between the outer sections and having parallel opposite faces which work in contact with the parallel walls of the outer wheel sections, and a plurality of arcuate springs arranged to support the movable section in normally concentric relation to the outer sections and adapted to permit said movable section to yield, said springs being secured consecutively at their extremities to the movable section and one of the outer sections, substantially as described.

In testimony whereof I affix my signature in presence of two witnesses.

THOMAS A. GANNOE.

Witnesses:
 JOHN SCHMUTZ,
 ALBERT H. SCHMUTZ.